United States Patent Office 3,022,219
Patented Feb. 20, 1962

3,022,219
ACYL ESTERS OF OLEANDOMYCIN
Walter D. Celmer, Garden City, N.Y., assignor to Chas. Pfizer & Co., Inc., New York, N.Y., a corporation of Delaware
No Drawing. Filed Mar. 7, 1958, Ser. No. 719,705
11 Claims. (Cl. 167—65)

This invention relates to new and useful acyl esters of oleandomycin and to methods for their production. It is particularly concerned with triacyloleandomycin, diacyloleandomycin and monoacyloleandomycin esters wherein the acyl moiety is derived from a lower aliphatic hydrocarbon monocarboxylic acid having from two to three carbon atoms in the acyl group. There is also included within the scope of this invention pharmaceutical compositions comprising these compounds together with pharmaceutically acceptable carriers.

The present application is a continuation-in-part of the earlier filed patent application, Ser. No. 664,175, filed on June 7, 1957, now abandoned, by W. D. Celmer. Oleandomycin is a commercially available antibiotic which is extremely valuable as a therapeutic agent as it exhibits a high activity against a wide variety of microorganisms and it is particularly noteworthy in its action on Gram-positive microorganisms. Its production and properties are described in detail in U.S. Patent 2,757,123, issued on July 31, 1956, to B. A. Sobin et al.

In accordance with the prior art, oleandomycin in its basic form has been found to be rather insoluble for the easy preparation of parenterally administrable solutions. Furthermore, acid addition salts of oleandomycin are generally either too insoluble in water to be satisfactory or else they are so acidic in their properties that the relatively low pH of their aqueous solutions causes a loss in potency of the acid labile antibiotic. In many instances in the past, the therapeutic administration of oleandomycin has been accomplished by the oral route as parenteral administration is often painful and irritating. However, the oral method is characterized by certain disadvantages, viz., oleandomycin and its acid addition salts are often very bitter and unpleasant to the taste; and oleandomycin is relatively unstable in the presence of acids such as those which are present in gastric juice so that its therapeutic efficiency is often reduced when administered orally due to partial decomposition in the stomach.

Thus, a primary object of the present invention is to provide a new series of oleandomycin derivatives which afford increased therapeutic serum levels of this antibiotic as compared to those afforded by oleandomycin base or its acid addition salts. A further object of this invention is to provide novel derivatives of oleandomycin which exhibit a marked stability in aqueous media so that they afford suitable dosage forms for intramuscular or intravenous administration. Other objects and advantages of the invention will be apparent during the course of the following description.

In accordance with the present invention, there has been discovered a new series of tri-, di-, and monoacyl esters of oleandomycin having the general formula:

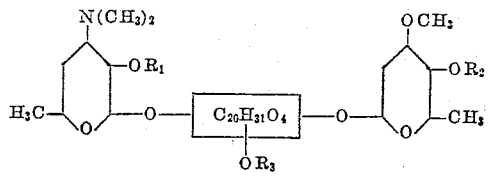

wherein $R_1$, $R_2$, and $R_3$ are selected from the group consisting of a hydrogen atom and an acyl moiety derived from a lower aliphatic hydrocarbon monocarboxylic acid having from two to six carbon atoms, at least one of said group being an acyl moiety. Examples of such acyl esters of oleandomycin include 1,2,3-triacetyloleandomycin, 2,3-diacetyloleandomycin, 1,3-diacetyloleandomycin, 1,2-diacetyloleandomycin, 3-monoacetyloleandomycin, 2-monoacetyloleandomycin, 1-monoacetyloleandomycin, 1,2,3-tripropionyloleandomycin, 2,3-dipropionyloleandomycin, 1,2,3-tributyryloleandomycin, 1,2,3-trivaleryloleandomycin, 1,2,3-tricaproyloleandomycin, and the like. In particular, it has been found that the advantages possessed by those ester derivatives of oleandomycin having from two to three carbon atoms in the acyl moiety are manifold: they are stable compounds having a low solubility in aqueous vehicles and high solubility in gastric juice; they are relatively non-toxic and tasteless; they are readily adsorbed into the blood stream; and finally, they are excreted in the urine to a highly significant degree. Hence, the herein described oleandomycin acyl esters of this invention are especially valuable in view of the surprising and unexpected properties which they possess; and in addition to fulfilling the aforementioned objects of this invention, they also exhibit utility as excellent urinary antiseptics.

As indicated above, the preparation and characterization of all the theoretically possible di- and monoacetyl derivatives of oleandomycin has been accomplished. These compounds are of obvious value as models for continuing chemical and biological studies. Considerable information on the differential reactivity of the various acylation sites in the desosamine ($R_1$), L-oleandrose ($R_2$) and oleandolide ($R_3$) moieties has been obtained as a consequence of the herein described efforts to procure the various partial esters. Selective acetylation and deacetylation reactions have been exploited to afford the indicated products. The individual acyl esters of oleandomycin so obtained have all been purified by such means as crystallization, simple extraction and/or countercurrent distribution; these esters all exhibit characteristic paper chromatographic migrations, properties which are useful in diagnostic and microanalytical work. Crystalline oleandomycin base or crystalline oleandomycin-chloroform adduct as well as crystalline 1,2,3-triacetyloleandomycin have been utilized as ultimate starting materials in these procedures. It should be noted that 2,3-diacetyloleandomycin, 1,3-diacetyloleandomycin and 3-monoacetyloleandomycin have all been obtained in crystalline form, while 1,2-diacetyloleandomycin, 1-monoacetyloleandomycin and 2-monoacetyloleandomycin have been obtained as homogeneous amorphous powders. It is significant to point out that all these esters exhibit a ketonic ultraviolet absorption maximum at 290 mμ

$$(E^{1\%}_{1\,cm.}\ 0.5\text{--}0.9)$$

which is typical of the intact oleandomycin moiety. Pertinent properties which indicate acylation at specific sites are as follows: ($R_1$) relatively low basicity, ($R_2$) characteristic Keller-Kiliani test and ($R_3$) positive Cotton effect rotatory dispersion curve. All of the esters possessing an acyl substituent in the desosamine moiety ($R_1$) have been found to exhibit a relatively low basicity ($pK_a$ 6.6). Furthermore, those esters possessing acyl substituents in the L-oleandrose moiety ($R_2$) exhibit a deep purple color when dissolved in glacial acetic acid containing an underlayer of concentrated sulfuric acid (modified Keller-Kiliani test). In contrast to the relative stability of these latter esters toward nitric acid, oleandomycin compounds not substituted at $R_2$ are visibly attacked by nitric acid (blue color). Finally, the principle of optical rotatory dispersion has been applied so as to give direct evidence of substitution in the macrolide nucleus, oleandolide ($R_3$). The proximity of an active group and $R_3$ has been previously discussed by H. Els et al., at the 130th National Meeting of the American Chemical Society (1956). It has been found that the rotatory dispersion curve of these acyl esters of oleandomycin which are unsubstituted at $R_3$ exhibit a single negative Cotton effect curve, while the corresponding esters having the substituents in the macrolide nucleus (oleandolide-substituted or $R_3$), exhibit a rotatory dispersion curve possessing a single positive Cotton effect superimposed on a plain negative curve. Although the two qualitatively different sets of rotatory dispersion curves show peaks at similar wave lengths (320–325 m$\mu$), the observed specific rotations differ by an order of magnitude.

The infrared spectra (in chloroform) of these model compounds have been measured and after the identity of each ester is established by other means, some limited correlations are subsequently afforded. For instance, those acyl esters of oleandomycin having the acyl substituent in the desosamine moiety ($R_1$) exhibit a characteristic band broadening at 9.4–9.6 m$\mu$; except for hydroxyl absorption at 2.95 m$\mu$, all of the partial esters in this group exhibit absorption curves similar to that of triacetyloleandomycin. Partial esters acylated in other moieties exhibit a typical doublet near 9.3$\mu$ and 9.6$\mu$; the general spectrum of these compounds is qualitatively similar to that of the intact oleandomycin molecule.

In accordance with the process of this invention, the triacyl esters of oleandomycin are produced by contacting oleandomycin under substantially anhydrous conditions with an acylating agent selected from the group consisting of lower aliphatic hydrocarbon monocarboxylic acid anhydrides having from two to six carbon atoms, said process being conducted in the presence of an organic base at a temperature in the range of from about 0° C. to about 50° C. for from about 5.0 to about 48 hours. As an excess of the acylating agent is preferably employed in this step, the corresponding 1,2,3-triacyloleandomycin esters are the sole products obtainable at this stage, i.e., all three of the hydroxyl groups in the oleandomycin molecule are acylated under these conditions. The second reaction step of this process comprises contacting the aforementioned 1,2,3-triacyl esters of oleandomycin with a water-miscible primary alkanol having from one to four carbon atoms at a temperature that is preferably in the range of from about 15° C. to about 45° C. for about 24 hours to about three weeks, depending upon the particular triacyl ester and hydrolyzing solvent used. In general, the amount of alkanol employed must be at least in sufficient volume to dissolve the triacyl ester. Finally, the corresponding 3-monoacyloleandomycin esters are produced by heating the 1,2,3-triacyloleandomycin esters in an aqueous-lower alkanolic (preferably about 3:2 by volume) solution at a temperature in the range of from about 45° C. to about 60° C. for about 0.5 to about 2.0 hours, said reaction being conducted at a pH that is in the range of from about pH 10.0 to about pH 11.0.

In addition, it has been found that the use of at least a substantially equivalent amount (in moles) of a lower acyl chloride in an inert organic solvent in the presence of a basic agent is an effective means for the introduction of an acyl substituent in the desosamine moiety ($R_1$) of those oleandomycin compounds that are unsubstituted in this portion of the molecule; it is to be noted that the basic agent must be present in a substantially sufficient amount to neutralize the liberated hydrogen chloride. This reaction may be carried out at a temperature in the range of from about 0° C. to about 50° C. for from about one to about five hours, although it is generally conducted at room temperature for the sake of convenience and economy. Preferred inert organic solvents for the process include acetone, ethyl acetate, benzene, toluene, chloroform, dioxane and diethyl ether, while preferred basic agents include alkali metal and alkaline-earth metal oxide, hydroxides, bicarbonates and carbonates, such as magnesium oxide, potassium hydroxide, sodium bicarbonate and magnesium carbonate, as well as tertiary amines such as triethyl amine, dimethylaniline and pyridine. Furthermore, the use of acetic or propionic anhydride alone, as a reagent and solvent without any basic catalyst, also gives the same general results, in addition to being an effective means for accomplishing a slow selective acylation of the L-oleandrose moiety ($R_2$); actually, this method affords acetylation of all the distinct moieties in oleandomycin, the desosamine hydroxyl ($R_1$) being rapidly acetylated (17 hours at 25° C.), the L-oleandrose hydroxyl ($R_2$) requiring a longer time (1–2 weeks at 25° C.), while the oleandolide hydroxyl ($R_3$) is only acetylated over a very long period of time (several months at 25° C.). Incidentally, the 1-monoacetyloleandomycin and the difficultly accessible 1,2-diacetyloleandomycin are formed as major products after treatment of an acetone solution of oleandomycin with excess ketene.

As indicated previously, selective deacylation of the desosamine moiety is readily effected by contacting the appropriate oleandomycin polyacyl ester with a water-miscible lower primary alkanol having from one to four carbon atoms whereby an ester exchange reaction occurs; it is to be noted that 2,3-diacetyloleandomycin, 2-monoacetyloleandomycin and 3-monoacetyloleandomycin are prepared in this manner. Finally, it has been found that treatment of the appropriate oleandomycin esters substituted at $R_2$ with methanol containing a catalytic amount of potassium hydroxide promptly effects deacylation of the L-oleandrose moiety; hence, this is an alternative preparative method for converting 1,2,3-triacetyloleandomycin to 1,3-diacetyloleandomycin, and for converting 2,3-diacetyloleandomycin to 3-monoacetyloleandomycin; this reaction occurs rapidly and affords an unusual approach to compounds retaining a desosamine acyl substituent, such as 1-monoacetyloleandomycin and 1,3-diacetyloleandomycin. The most stable monoacyl ester, 3-monoacetyloleandomycin, can then be slowly deacetylated to detectable amounts of oleandomycin with this reagent.

The herein described oleandomycin acyl esters of this invention having from two to three carbon atoms in the acyl moiety may be administered either alone or in combination with a pharmaceutically acceptable carrier and by the both the oral and parenteral routes. The usual dosage for administration to humans is in the range of approximately 50–600 mg. per day, and preferably in about one to about four doses. However, this dosage may vary somewhat with the weight of the subject being treated; in general, about 1–10 mg./kg. of body weight per day is usually employed.

In the case of the polyacyl esters of oleandomycin having from two to three carbon atoms in the acyl moiety, the preferred route of administration is oral and the desired compounds may be administered for these purposes in the form of capsules, tablets, syrups, emulsions, aqueous suspensions, elixirs and other similar pharmaceutical preparations. Preferred methods of orally administering these polyacyloleandomycin esters include administering them in the form of hard-filled gelatin capsules containing an inert-filler such as lactose or milk sugar, or as tablets containing excipients such as starch, magnesium stearate, sodium citrate, polyvinylpyrrolidone, polyethylene glycol, etc.; or they may be administered as aqueous suspensions, syrups, emulsions or elixirs in a carrier containing a suitable sweetening and/or flavoring agent and perhaps, even a coloring agent, e.g., cherry-red colored, raspberry flavored syrups are often employed. In addition, triacetyloleandomycin affords substantially high blood levels when administered intramuscularly in a 10% (by weight) aqueous solution of glutamic acid hydrochloride.

In the case of the 3-monoacyl esters of oleandomycin having from two to three carbon atoms in the acyl moiety, the preferred method of administration is parenteral as these compounds form stable dosage forms suitable for intramuscular or intravenous injections, although this method need not be restricted to the monoacyl esters as it is also applicable to the corresponding polyacyl compounds. In particular, 3-monoacetyloleandomycin has been administered intramuscularly in the form of an aqueous ascorbic acid solution. It should be noted that such aqueous pharmaceutical compositions suitable for parenteral administration must necessarily be prepared under aseptic conditions. This may be readily accomplished by employing distilled water and then filtering the dissolved solution through a Seitz filter. Furthermore, these aqueous compositions should also be rendered isotonic by the addition of a sufficient amount of saline or glucose before parenteral administration.

In accordance with a specific embodiment of the process of this invention, the triacylation of oleandomycin is preferably catalyzed by an organic base as the latter agent aids the reaction by shifting the equilibrium to the side of the polyacyl ester. Although any basic material would be effective in this regard, it is most desirable to employ an organic base such as a tertiary amine. Examples of such tertiary amines include pyridine, picoline, lutidine, collidine, quinoline, N,N-dimethylaniline, N,N-diethylaniline and triethylamine. It should be noted that suitable oleandomycin starting materials include oleandomycin base and oleandomycin-chloroform adduct, as well as various oleandomycin acid addition salts, such as the hydrochloride, provided that the free base is first liberated from the latter salts by the addition of a suitable amount of an alkaline hydroxide. Incidentally, the chloroform adduct is readily obtained from chloroform-extracts of the oleandomycin whole fermentation broth by means of evaporation of the chloroform solvent until crystallization commences. Inasmuch as the triacylation reaction is exothermic, optimum results are best obtained when cooling is employed in order to control the temperature in the desired range. Although the reaction may be suitably conducted in the aforementioned range of from about 0° C. to about 50° C., it is preferably conducted at a temperature in the range of from about 25° C. to about 38° C. Similarly, although it may be carried out for a period from about 5.0 to about 48 hours as aforesaid, it is preferably conducted for a time period of about 14 to about 18 hours. As previously stated, an excess of the acylating agent is employed as this ensures not only completion of the reaction, but it also prevents formation of mono- and diacyl by-products. However, it has been found that optimum conditions are generally obtained when the volume of acyl anhydride is approximately twice the weight of the oleandomycin starting material and the organic base catalyst is present in an amount that is at least five percent by weight of that of the acylating agent. In view of the fact that both the acylating agent and the acylated product may possibly be subject to hydrolysis at the upper temperature range of the reaction, anhydrous conditions are preferably maintained throughout the process. In addition, the process is preferably conducted in the presence of an inert atmosphere, such as a nitrogen atmosphere, but this is not absolutely necessary. Furthermore, the process may also be suitably carried out in an inert organic solvent medium, such as benzene or toluene, or it may be found desirable to employ an excess of the organic base catalyst, such as pyridine, as a solvent for the reaction.

The dissolved triacyloleandomycin is then conveniently recovered from the reaction mixture by means of standard procedures well-known in the art. For instance, the reaction mixture may be first diluted with water and the resulting aqueous reaction mixture can then be subsequently extracted with a water-immiscible organic solvent and preferably a chlorinated hydrocarbon solvent, such as methylenedichloride, chloroform, trichloroethylene, trichloroethane, tetrachlorethane, and the like. The solvent extract is then dried over a suitable drying agent, such as anhydrous magnesium sulfate or anhydrous sodium sulfate, and the desired tri-ester is then precipitated from the dried solvent filtrate by the addition of a lower aliphatic hydrocarbon solvent, such as petroleum ether or ligroin. Alternatively, the dilute aqueous reaction mixture may be suitably adjusted to a pH value of about pH 8.0±0.5 by the addition of a dilute basic solution, such as 0.1 N sodium hydroxide, whereby the triacyloleandomycin precipitates from the aforementioned aqueous reaction medium. In either case, the crude product is obtained in yields ranging from about 80% to about 90%. Purification of this material is then conveniently effected by means of recrystallization from a suitable organic solvent, such as a lower alkanol and preferably hot isopropanol or isopropanol-water (1:2); the pure crystalline triacyloleandomycin ester is generally isolated in yields ranging from about 60% to about 70%.

The process for the conversion of the 1,2,3-triacyloleandomycin esters to the corresponding 2,3-diacyloleandomycin esters is then carried out by the method hereinbefore mentioned. This process for producing 2,3-diacyloleandomycin comprises contacting the corresponding triacyl ester with about 3.0 to about 5.0 parts by weight of a water-miscible lower primary alkanol having from one to four carbon atoms at a temperature that is preferably in the range of from about 15° C. to about 45° C. for a time period of about 24 hours to about three weeks, as aforementioned. Preferred water-miscible lower primary alkanols include methanol, ethanol, n-propanol, n-butanol, ethylene glycol, propylene glycol, and the like. The desired conditions for best effecting this conversion vary with the particular lower alkanol employed. For instance, the reaction is substantially complete after contacting 1,2,3-triacetyloleandomycin with methanol at room temperature for about 24 hours, but the same reaction in ethanol requires a time period of about three days, and a time period of about three weeks is necessary in order to effect the same reaction in n-propanol. The herein described reaction is suitably illustrated by the following equation for the conversion of 1,2,3-triacyloleandomycin to 2,3-diacyloleandomycin in the presence of one of the aforementioned water-miscible lower primary alkanols:

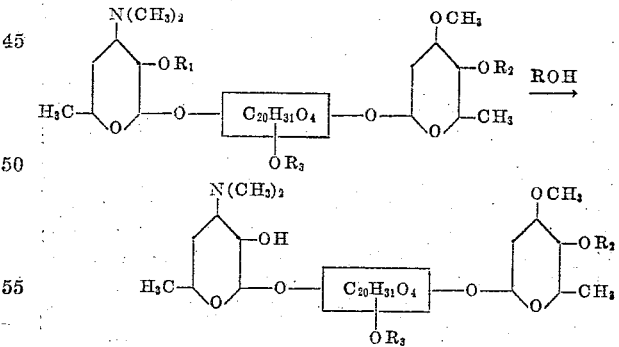

where:
R=CH$_3$, C$_2$H$_5$, n-C$_3$H$_7$, n-C$_4$H$_9$, HOC$_2$H$_4$, HOC$_3$H$_6$
and
R$_1$=R$_2$=R$_3$=CH$_3$CO, C$_2$H$_5$CO, C$_3$H$_7$CO, C$_4$H$_9$CO, C$_5$H$_9$CO The formation of the diacyl ester during the course of the reaction can be conveniently followed by means of paper chromatography wherein cyclohexane-benzene (1:1 by volume) is employed as the mobile phase and paper that has been impregnated with methanol-dimethylformamide (1:1 by volume) is employed as the stationary phase. This separation is based upon the fact that the diacyloleandomycin ester is a more polar compound than the corresponding triacyloleandomycin. Similarly, both polyesters are less polar than monoacyloleandomycin and oleandomycin base as is revealed in standard papergram systems wherein chloroform-benzene (1:1 by volume) is employed as the mobile phase and paper impregnated with methanol-dimethylformamide (1:1 by volume) is employed as the stationary phase. Recovery of the desired diacyloleandomycin from the reaction solution is easily carried out by such standard means as, for example, treating the alcoholic reaction mixture with water until the desired product crystallizes from solution, or recovery of this same product may be suitably effected by concentrating the aforementioned reaction solution, preferably by means of evaporation under reduced pressure. In the latter case, an amorphous residue is obtained which crystallizes immediately upon trituration with a lower dialkyl ether and preferably anhydrous diethyl ether; subsequent concentration of the latter solution affords a high yield of the 2,3-diacyloleandomycin in pure crystalline form. When 1,2-diacetyloleandomycin is employed as the starting material in this reaction, the product obtained is 2-monoacetyloleandomycin.

Finally, the corresponding monoacyloleandomycin esters can be prepared from either the triacyloleandomycin or diacyloleandomycin esters previously discussed. For example, 2,3-diacyloleandomycin may be hydrolyzed to the corresponding 3-monoacyl ester in an aqueous solvent medium by the use of at least a substantially molar equivalent amount of an alkali metal hydroxide or an alkaline-earth metal hydroxide, and preferably sodium hydroxide. An alternative method, which is less satisfactory, comprises dissolving either 1,2,3-triacyloleandomycin or 2,3-diacyloleandomycin in an aqueous-alkanolic solvent medium, wherein the alkanol is a water-miscible lower primary alkanol, and allowing the resulting solution to sand at a temperature in the range of from about 20° C. to about 60° C. for a time period that may vary from several days to several weeks; however, the solid product which separates from this solution is often a mixture of monoacyloleandomycin together with diacyloleandomycin, oleandomycin base and degradation products thereof. A still further method and one which is the preferred process of this invention for producing monoacyloleandomycin, comprises heating an aqueous-lower alkanolic (preferably about 3:2 by volume) solution of 1,2,3-triacyloleandromycin, wherein the lower alkanol has from one to three carbon atoms, at a temperature in the range of from about 45° C. to about 60° C. for about 0.5 to about 2.0 hours, said process being conducted at a pH that is in the range of from about pH 10.0 to about 11.0; the latter condition is best effected by the addition of a suitable amount of a basic agent, such as an alkali-metal hydroxide or alkaline-earth metal hydroxide, and preferably sodium hydroxide. It should be noted that the above reaction conditions are somewhat critical in that degradation occurs when the reaction is carried out at higher temperatures and that the formation of anhydrooleandomycin is the major reaction product when the process is conducted above a pH of 11.0; furthermore, if the reaction is conducted below the aforementioned temperature and pH ranges, the rate of hydrolysis is extremely slow and the reaction can hardly be said to proceed at all from a practical point of view. In this process, it is also interesting to note that the rate of hydrolysis can be accelerated by increasing the water content of the reaction mixture; inasmuch as the use of a large amount of water at the out-set of the reaction may precipitate crystalline triacylolenandomycin or diacyloleandomycin, it is desirable to hold some of the water (approximately one-fifth to about one-eighth the total volume employed) in reserve until hydrolysis is partially completed. The desired 3-monoacyloleandomycin is conveniently recovered from the reaction mixture after the completion of this step by readjusting the solution to pH 9.5 and then concentrating said solution in vacuo to about one-half its original volume. The crystalline material which separates affords pure monoacyloleandomycin after one recrystallization from a hot lower alkanol solution. 3-monoacetyloleandomycin is more stable than oleandomycin base under ordinary alkaline saponification conditions. Efforts to hasten the conversion of 3-monoacetyloleandomycin to oleandomycin by various means often results in the formation of the aforementioned anhydrooleandomycin; this is an $\alpha,\beta$-unsaturated ketone that has previously been prepared and described by H. Els et al., as reported at the 130th National Meeting of the American Chemical Society (1956).

The value of the herein described polyacyloleandomycin esters having from two to three carbon atoms in the acyl moiety is conveniently illustrated in urine excretion studies wherein human subjects are each administered a particular triacyloleandomycin compound in the form of a gelatin capsule. The urine samples are then submitted for a bioassay of the oleandomycin activity and the percentage of the initial dose excreted in the urine is subsequently calculated. The results obtained demonstrate that the herein described polyacyloleandomycin esters of this invention having from two to three carbon atoms in the acyl moiety are very readily absorbed and that they are excreted to a substantially high degree in the urine as compared with oleandomycin base. For example, in the case of triacetyloleandomycin, the results obtained show that the triacetyl ester is well absorbed from the gastrointestinal tract and that oleandomycin activity is found in the urine in an amount approximately twice that obtained after oral administration of oleandomycin base. These results are of particular significance in view of the fact that triacetyloleandomycin possesses only about one-fifth the activity of the base in vitro; the tripropionyloleandomycin esters behave in substantially the same manner. Furthermore, bio-autograms of the urine samples reveal the presence of diacyloleandomycin, monoacyloleandomycin and oleandomycin base, thus indicating that hydrolysis has occurred. Hence, the total bio-activity measured in the urine includes both highly active oleandomycin base and relatively less active (in vitro) triacyloleandomycin, diacyloleandomycin and monoacyloleandomycin. Accordingly, the weight excretion percentage figure after triacyloleandomycin ingestion is actually higher than that cited in the examples of this invention. Hence, it is readily demonstrated that triacyloleandomycin esters having from two to three carbon atoms in the acyl moiety are highly absorbed and that they exhibit an excretion pattern that is substantially superior to that shown by oleandomycin base. As can be well understood by those skilled in the art, this result is completely unexpected.

Furthermore, the actual blood levels obtained after oral administration of the aforementioned polyacyloleandomycin esters are truly significant. For instance, after oral administration of 500 mg. of oleandomycin activity or its molar equivalent, the following blood levels are obtained:

CONCENTRATION OF OLEANDOMYCIN IN SERUM (UNITS/ML.)

| Oleandomycin Compound | No. of Subjects | Time (Hours) | | |
|---|---|---|---|---|
| | | 2 | 3 | 6 |
| Oleandomycin base | 9 | 0.733 | 0.955 | 0.711 |
| 2,3-Diacetyloleandomycin | 10 | 1.208 | 1.164 | 0.680 |
| 1,2,3-Triacetyloleandomycin | 10 | 2.417 | 2.383 | 1.541 |

As can be seen from the above table, the oleandomycin concentration level in the serum is substantially greater when it is orally administered as a polyacyl oleandomycin ester as compared with oleandomycin base itself.

Finally, as previously indicated, the corresponding 3-monoacyloleandomycin esters are of especial value in that they are extremely stable compounds which are not prone to hydrolysis unlike the polyacyl esters. Hence, they are useful for preparing parenteral compositions that are to be administered either intramuscularly or intravanously. Suitable pharmaceutical carriers for these purposes include diethyl carbonate, dimethylformamide, sesame oil, coconut oil, 10% aqueous glutamic acid hydrochloride and aqueous ascorbic acid. In addition, these 3-monoacyloleandomycin esters may also be administered orally in the form of hard-filled gelatin capsules containing an inert filler such as lactose or as tablets containing excipients such as starch, or they may be administered in the form of syrups, emulsions or aqueous suspensions that have been suitably colored and flavored.

Thus, this invention provides an economical and efficient process for the production of the herein described triacyloleandomycin, diacyloleandomycin and monoacyloleandomycin compounds which all possess a therapeutic utility in that they are readily absorbed into the blood stream and exhibit highly significant excretion patterns. The 1,2,3-triacyloleandomycin esters having from two to three carbon atoms in the acyl moiety are particularly useful in this regard, while the corresponding 3-monoacyloleandomycin compounds have a further advantage in that they are extremely stable in aqueous media and so readily lend themselves to use in parenterally administrable pharmaceutical compositions.

This invention is further illustrated by the following examples, which are not to be considered as imposing any limitations on the scope thereof.

Example I

To a chilled solution of 2,000 ml. of acetic anhydride and 160 ml. of pyridine there were added step-wise in approximately 50 g. portions 100 g. of oleandomycin-chloroform adduct, said addition being conducted in the presence of a nitrogen atmosphere and the rate of addition being so controlled as to coincide with the rate of solution. Throughout this addition, which required about 4.5 hours, the temperature was maintained in the range of 25–38° C., external cooling being employed when necessary. After completion of this step, agitation of the reaction mixture was continued for an additional 12 hours during which time period the reaction solution was allowed to attain room temperature. At the end of this time, the aforesaid reaction mixture was diluted with 10 liters of water and the resulting aqueous solution was subsequently adjusted to pH 8.0–8.5 with 10 N sodium hydroxide and then extracted with 4.0 liters of methylene chloride. The solvent extract layer was then separated from the aqueous phase and dried over anhydrous sodium sulfate (1 lb.) in order to remove any excess water. The dried extract was then filtered and the resulting filtrate was concentrated to about one-half of its original volume by means of evaporation under reduced pressure. To the residual organic concentrate there were then added slowly 9.0 liters of petroleum ether with constant agitation. Crystallization of the desired product could easily be induced by cautiously seeding the solution; after the collection of the first crystalline crop of material by means of filtration, a second crop equal to about one-half the weight of the first crystalline fraction was obtained by the addition of 6.0 liters of petroleum ether to the mother liquor. The combined crystalline fractions amounted to 1,065 g. (90%); they were further purified by recrystallization from 4.5 liters of hot isopropanol to afford 550 g. of pure crystalline 1,2,3-triacetyloleandomycin having the following properties: M.P. 177° C.; $[\alpha]_D^{25°}$ −23° (C., 1; MeOH); $pK_a'$ 6.6 (EtOH:H$_2$O).

Analysis.—Calcd. for $C_{41}H_{67}NO_{15}$: C, 60.50; H, 8.30; N, 1.72; $CH_3CO$, 15.8. Found: C, 60.58; H, 8.02; N, 1.78; $CH_3CO$, 15.7.

Example II

To a chilled solution of 1000 ml. of acetic anhydride and 50 ml. of pyridine there were added step-wise with constant agitation 1000 g. of oleandomycin base in the presence of a nitrogen atmosphere and in accordance with the reaction conditions described in Example I. After the final addition of oleandomycin, a further 100 ml. of acetic anhydride was added to the reaction solution and agitation of the same was continued for an additional 24 hours. The isolation procedure employed for the recovery of the desired product was the same as that described in the previous example and the yield of crude triacetyloleandomycin obtained amounted to 910 g.; recrystallization from 4.0 liters of hot isopropanol afforded 490 g. of the pure product.

Example III

The procedure employed here was the same as that described in Examples I and II except that the method for isolating the final product was somewhat different in that it did not entail solvent extraction, but rather precipitation of the final product from the reaction solution. This was accomplished by adjusting the aqueous reaction mixture (which had previously been diluted with 10 liters of water) to a pH of 7.5 by the addition of a sufficient amount of 10 N sodium hydroxide. The resulting precipitate was then agitated for 1.5 hours and finally, it was filtered and washed with cold water. The crystalline cake so obtained was initially air dried and then subsequently dried in vacuo at 65° C. until constant weight was attained. In this manner, crude triacetyloleandomycin was obtained; this material was purified by means of recrystallization from 12 liters of hot isopropanol-water (1:2 by volume). The crystalline material so obtained was identical in every respect with that described in Example I.

Example IV

The procedures described in the previous examples for the preparation and isolation of triacetyloleandomycin were followed here except for the fact that propionic anhydride was the acylating agent employed and 1,2,3-tripropionyloleandomycin (M.P. 156–157° C.) was the product obtained. In the same manner, 1,2,3,-tributyryloleandomycin (M.P. 99–101° C.) was obtained when butyric anhydride was employed as the acylating agent in accordance with the previously described procedures. In addition, 1,2,3-trivaleryloleandomycin and 1,2,3-tricaproyloleandomycin were also prepared by reacting oleandomycin with valeryl anhydride and caproyl anhydride, respectively.

Example V

A solution of 270 g. of 1,2,3-triacetyloleandomycin in 2.2 liters of methanol was allowed to stand at room temperature for 48 hours. At the end of this time, the reaction solution was evaporated to dryness to afford an amorphous residue which was subsequently dissolved in 1.8 liters of diethyl ether. Upon evaporation of the etheral solution, a quantitative yield of crystalline 2,3-diacetyloleandomycin was obtained. Alternatively, the same di-ester was also recovered from the methanolic solution by means of precipitation upon the addition of 7.0 liters of water; constant agitation was continued for an additional 0.5 hour after crystallization of the desired product had occurred. The crystalline material was then filtered and air-dried at room temperature until constant weight was attained; the yield of crude product amounted to 225 g. Further purification of this material was carried out by means of recrystallization from ethyl acetate-petroleum ether whereby pure 2,3-diacetyloleandomycin was obtained in the form of characteristic clusters of rectangular plates having the following properties: M.P. 182° C. (decomp.) $[\alpha]_D^{25°}$ −19° (C., 1; MeOH); $pK_a'$ 7.7 (EtOH:H$_2$O); on admixture with an authentic sample of 1,2,3-triacetyloleandomycin there was obtained a M.P. depression of about 12–27° C. (M.P. 155–170° C.).

*Analysis.*—Calcd. for $C_{39}H_{65}NO_{14}$: C, 60.68; H, 8.49; N, 1.81; $CH_3CO$, 10.9. Found: C, 60.78; H, 8.70; N, 2.02; $CH_3CO$, 10.8.

The same product was also obtained when 1,2,3-triacetyloleandomycin was allowed to stand in ethanol at room temperature for three days; when n-propanol was employed, the required time period was about three weeks.

*Example VI*

When 1,2,3-tripropionyloleandomycin was subjected to the same procedure as described in Example V, the product obtained was 2,3-dipropionyloleandomycin. In the same manner, 1,2,3-tributyryloleandomycin was converted to 2,3-dibutyryloleandomycin, 1,2,3-trivaleryloleandomycin was converted to 2,3-divaleryloleandomycin and 1,2,3-tricaproyloleandomycin was converted to 2,3-dicaproyloleandomycin.

*Example VII*

To a solution consisting of 100 g. of 1,2,3-triacetyloleandomycin dissolved in 1200 ml. of hot methanol (55–60° C.) there were added 100 ml. of warm water (45° C.); the resulting clear solution had a temperature in the range of 50–53° C. and it possessed a pH value in the range of pH 8.5–9.0. There were then added to this solution 245 ml. of 1 N sodium hydroxide at such a rate as to maintain the temperature of the reaction solution in the range of 47–50° C. and the pH in the range of 10.8–11.0; this required the rapid addition of about 20 ml. of the sodium hydroxide solution, followed by slow addition of the remainder at a steady or slightly increasing rate. An additional 200 ml. of water was added after 0.5 mole of base had been introduced. The entire operation was carried out during the course of 70 to 100 minutes.

The resulting clear aqueous solution was then adjusted to pH 9.5 by the addition of glacial acetic acid and it was then immediately concentrated in vacuo to a volume of about 600–700 ml. The colorless crystalline material which had separated during the latter half of the concentration step was then filtered, washed with water and dried in vacuo at 50–60°. The yield of crude product (M.P. 155–160° C.) obtained amounted to 78 g. The latter material was purified by means of recrystallization from hot isopropanol and the pure crystalline material so obtained was filtered and washed with cold isopropanol. The yield of pure 3-monoacetyloleandomycin amounted to 63 g. and possessed the following properties: M.P. 181–182° C.; its optical rotatory dispersion curve exhibited a positive Cotton effect.

*Analysis.*—Calcd. for $C_{37}H_{63}NO_{13}$: $CH_3CO$, 5.90. Found: $CH_3CO$, 6.10.

*Example VIII*

To a solution consisting of 10 milliequivalents of oleandomycin dissolved in 50 ml. of acetone there were added 4 g. of sodium bicarbonate. The resulting suspension was then stirred under anhydrous conditions while a solution of 10 milliequivalents of acetyl chloride in 5 ml. of acetone was slowly added during the course of 0.5 hour; the reaction mixture was then stirred for an additional 2.0 hours. The inorganic material was then removed by means of filtration and the resulting filter cake was washed with 25 ml. of acetone. The combined filtrate and washings were then evaporated to dryness under reduced pressure and there was obtained an 80% yield of 1-monoacetyloleandomycin, M.P. 100° C.

*Analysis.*—Calcd. for $C_{37}H_{63}NO_{13}$: $CH_3CO$, 5.90. Found: $CH_3CO$, 6.30.

In the same manner, 2-monoacetyloleandomycin was converted via this procedure to 1,2-diacetyloleandomycin.

*Analysis.*—Calcd. for $C_{39}H_{65}NO_{14}$: $CH_3CO$, 10.9. Found: $CH_3CO$, 11.1.

Similarly, 3-monoacetyloleandomycin was converted via this procedure to 1,3-diacetyloleandomycin (M.P. 161° C.) in a 90% yield. This same product was also obtained when the reaction was conducted in other inert organic solvents in lieu of acetone such as ethyl acetate, benzene, toluene, chloroform, dioxane and diethyl ether.

*Analysis.*—Calcd. for $C_{39}H_{65}NO_{14}$: $CH_3CO$, 10.9. Found: $CH_3CO$, 10.9.

Finally, 2,3-diacetyloleandomycin was converted via this procedure to 1,2,3-triacetyloleandomycin.

*Example IX*

2-monoacetyloleandomycin was dissolved in twice its weight of acetic anhydride and the resulting reaction solution was allowed to stand at 25° C. for 17 hours. The reaction mixture was then treated with sufficient water to decompose the acetic anhydride and to adjust the resulting acetic acid solution to a normality of 3.5. The product was then isolated by adjusting the quench solution to pH 8.0–8.5 with 10 N aqueous caustic and then twice extracting the aqueous medium with an equal volume of methylene chloride. The combined solvent extracts were dried over anhydrous sodium sulfate, filtered and evaporated to dryness under reduced pressure. There was obtained a 50% yield of 1,2-diacetyloleandomycin.

In the same manner, oleandomycin was converted to 1-monoacetyloleandomycin in an 80% yield, 3-monoacetyloleandomycin was converted to 1,3-diacetyloleandomycin, and 2,3-diacetyloleandomycin was converted to 1,2,3-triacetyloleandomycin. When 1-monoacetyloleandomycin was subjected to the above procedure except for the fact that the reaction time was extended to two weeks, the product obtained was 1,2-diacetyloleandomycin. Similarly, 1,3-diacetyloleandomycin was converted to 1,2,3-triacetyloleandomycin.

Finally, when 1,2-diacetyloleandomycin was subject to this same procedure except for the fact that the reaction solution was allowed to stand at 25° C. in excess of two weeks, 1,2,3-triacetyloleandomycin was detectable via paper chromatograms. The amount of 1,2,3-triacetyloleandomycin became appreciable after several months. Interestingly, both 1-monoacetyloleandomycin and 1,2-diacetyloleandomycin were the major products obtained after treatment of an acetone solution of oleandomycin with an excess (in moles) of ketene.

*Example X*

The procedure followed was the same as that described in Example V except that 2,3-diacetyloleandomycin was the starting material employed and the reaction time was several months; the product obtained was 3-monoacetyloleandomycin. When this same procedure was applied to 1,2-diacetyloleandomycin for a 24 hour period, 2-monoacetyloleandomycin was obtained in a 90% yield.

*Analysis.*—Calcd. for $C_{37}H_{63}NO_{13}$: $CH_3CO$, 5.9. Found: $CH_3CO$, 5.9.

*Example XI*

A solution of 1.2 milliequivalents of 2,3-diacetyloleandomycin dissolved in 2.7 ml. of methanol was treated with 0.3 ml. of 2 N methanolic potassium hydroxide at 25° C. for 16 hours. An aliquot was then withdrawn, quenched in aqueous pH 4.0 buffer and the resulting solution subjected to paper chromatography wherein 3-monoacetyloleandomycin was revealed to be the product formed. When 1,2,3-triacetyloleandomycin was employed as the starting material in this reaction, the major product obtained after a reaction period of approximately twenty minutes was 1,3-diacetyloleandomycin; at the end of 17 hours, 3-monoacetyloleandomycin was afforded. This latter compound could then be slowly deacetylated to detectable amounts of oleandomycin base by this same reaction; efforts to hasten the conversion of 3-monoacetyloleandomycin to oleandomycin base by various other means resulted in the formation of anhydrooleandomycin, an $\alpha,\beta$-unsaturated ketone.

Example XII

In a typical blood serum level study, each subject was orally administered on separate days 500 mg. of oleandomycin base, 500 mg. of 2,3-diacetyloleandomycin and 500 mg. of 1,2,3-triacetyloleandomycin. It was found that after two hours, 1,2,3-triacetyloleandomycin was absorbed to the extent of 2.416 units/ml. of serum, while the corresponding value for 2,3-diacetyloleandomycin was 1.208 units/ml. and for oleandomycin base, 0.733 mcg./ml. It should be noted that one unit of oleandomycin is defined as that amount of oleandomycin activity exhibited by 1 mcg. of oleandomycin base. After three hours, the respective values were 2.384 units/ml., 1.164 units/ml. and 0.955 mcg./ml.; after six hours, the corresponding values were 1.541 units/ml., 0.680 units/ml. and 0.711 mcg./ml., respectively.

Example XIII

On separate days, each of the subjects was given a 500 mg. dose of oleandomycin base and a 500 mg. dose of triacetyloleandomycin. After 24 hours, it was found with triacetyloleandomycin the average amount of antibiotic activity (expressed as oleandomycin units) excreted was 23.5% ±10.3, while oleandomycin base was excreted to an average extent of 10.2% ±2.0. In the case of triacetyloleandomycin, the percentage figure reported is determined from the weight of the compound administered in view of the low activity of the ester in vitro; in all other cases, the percentage figure reported is based on the amount of oleandomycin activity administered.

Example XIV

In a typical six hour excretion study, five subjects were each given 100 mg. of triacetyloleandomycin and five other individuals were each given 83 mg. of oleandomycin activity in the form of the phosphate salt. It was found that with triacetyloleandomycin the average amount of antibiotic activity (expressed as oleandomycin units) excreted after six hours was 9.9%, while that with the oleandomycin phosphate salt was 3.8%.

Example XV

A crossover experiment was conducted in which the subjects receiving triacetyloleandomycin on the first trial day of the experiment received oleandomycin on the second trial day, while those receiving the antibiotic base on the first trial day received the corresponding triacetylated compound on the second trial day; the time interval between doses was 72 hours. It was found that with triacetyloleandomycin the average amount of antibiotic activity excreted after 24 hours was 21.4% ±6.3, while the oleandomycin base was excreted to an average extent of 6.9% ±2.4.

What is claimed is:
1. A compound having the general structural formula:

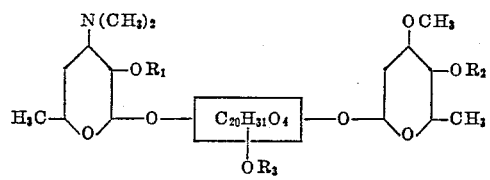

wherein $R_1$, $R_2$ and $R_3$ are selected from the group consisting of a hydrogen atom and an acyl moiety derived from a lower alkane hydrocarbon monocarboxylic acid having from two to three carbon atoms, at least one of said groups being an acyl moiety.

2. A pharmaceutical composition comprising as the essential active ingredient a compound as claimed in claim 1 together with a pharmaceutically acceptable carrier.

3. 1,2,3-triacetyloleandomycin, being the compound of claim 1 wherein each of $R_1$, $R_2$ and $R_3$ is acetyl.

4. 2,3-diacetyloleandomycin, being the compound of claim 1 wherein $R_1$ is hydrogen and each of $R_2$ and $R_3$ is acetyl.

5. 1,3-diacetyloleandomycin, being the compound of claim 1 wherein each of $R_1$ and $R_3$ is acetyl and $R_2$ is hydrogen.

6. 3-monoacetyloleandomycin, being the compound of claim 1 wherein each of $R_1$ and $R_2$ is hydrogen and $R_3$ is acetyl.

7. 1,2,3-tripropionyloleandomycin, being the compound of claim 1 wherein each of $R_1$, $R_2$ and $R_3$ is propionyl.

8. The process for producing 1,2,3-triacyloleandomycin wherein the acyl moiety is derived from a lower alkane hydrocarbon monocarboxylic acid having from two to three carbon atoms, which comprises contacting oleandomycin under substantially anhydrous conditions with an acylating agent selected from the group consisting of the corresponding lower alkane hydrocarbon monocarboxylic acid anhydrides in the presence of a reaction-inert tertiary amine at a temperature in the range of from about 0° C. to about 50° C. for from about 5.0 to about 48 hours, said acylating agent being present in such an amount that its volume is at least twice the weight of the oleandomycin starting material and said tertiary amine is present in an amount that is at least five percent by weight of that of the acylating agent.

9. The process for producing 2,3-diacyloleandomycin wherein the acyl moiety is derived from lower alkane hydrocarbon monocarboxylic acid having from two to three carbon atoms, which comprises contacting the corresponding triacyloleandomycin with about 3.0 to about 5.0 parts by weight of a water-miscible lower primary alkanol having from one to four carbon atoms at a temperature in the range of from about 15° C. to about 45° C. for from about 24 hours to about three weeks.

10. The process for producing 1,3-diacyloleandomycin wherein the acyl moiety is derived from a lower alkane hydrocarbon monocarboxylic acid having from two to three carbon atoms, which comprises contacting the corresponding 3-monoacyloleandomycin in a reaction-inert organic solvent under substantially anhydrous conditions with at least an equivalent amount in moles of an acyl chloride having from two to three carbon atoms in the presence of a base at a temperature of from about 0° C. to about 50° C. for from about one to about five hours, said basic agent being present in a substantially sufficient amount to neutralize the liberated hydrogen chloride.

11. The process for producing 3-monoacyloleandomycin wherein the acyl moiety is derived from a lower alkane hydrocarbon monocarboxylic acid having from two to three carbon atoms, which comprises heating an aqueous-lower alkanolic solution of the corresponding 1,2,3-triacyloleandomycin, wherein the lower alkanol has from one to three carbon atoms and the volume ratio of said alkanol to water is about 2:3, at a temperature in the range of from about 45° C. to about 60° C. for from about 0.5 to about 2.0 hours at a pH that is in the range of from about pH 10.0 to about pH 11.0.

References Cited in the file of this patent

UNITED STATES PATENTS

| | | |
|---|---|---|
| 2,483,885 | Crooks et al. | Oct. 4, 1949 |
| 2,662,906 | Edgerton | Dec. 15, 1953 |
| 2,812,349 | Gordon | Nov. 5, 1957 |
| 2,862,921 | Booth et al. | Dec. 2, 1958 |

OTHER REFERENCES

Reisch et al.: Proceedings of the Staff Meetings of the Mayo Clinic, vol. 33, No. 8, April 16, 1958, pages 187–193.

(Other references on following page)

OTHER REFERENCES

Grant: Hackh's Chemical Dictionary, 3d ed., McGraw-Hill Book Co. Inc., 1944, page 32.

Sobin et al.: Antibiotics Annual, 1954–1955, Medical Encyclopedia, Inc., 1955, pages 827–839.

Shidlovsky et al.: Antibiotics Annual 1953–1954, Medical Encyclopedia, Inc., 1953, pages 548–559.

Hochstein et al.: J.A.C.S., vol. 76, No. 20, October 20, 1954, pages 5080–5083.

Murphy: Antibiotics Annual 1953–1954, Medical Encyclopedia, Inc., 1953, pages 500–513.

Stephens: Antibiotics Annual 1953–1954, Medical Encyclopedia, Inc., 1953, pages 514–521.

Lear: Saturday Review, January 3, 1959, pages 35–41.

Lear: Saturday Review, February 7, 1959, pages 43–48.